(12) United States Patent
Ireland

(10) Patent No.: US 9,106,113 B2
(45) Date of Patent: Aug. 11, 2015

(54) COMPONENTS FOR GENERATORS, THEIR USE AND STATOR MOUNTING

(75) Inventor: Barry Ross Ireland, Moosomin (CA)

(73) Assignee: Whirlwind Energy Inc., Boissevain, Manitoba (CA)

( * ) Notice: Subject to any disclaimer, the term of this patent is extended or adjusted under 35 U.S.C. 154(b) by 402 days.

(21) Appl. No.: 13/635,628

(22) PCT Filed: Mar. 16, 2011

(86) PCT No.: PCT/CA2011/000276
§ 371 (c)(1),
(2), (4) Date: Sep. 17, 2012

(87) PCT Pub. No.: WO2011/113143
PCT Pub. Date: Sep. 22, 2011

(65) Prior Publication Data
US 2013/0009406 A1    Jan. 10, 2013

Related U.S. Application Data

(60) Provisional application No. 61/314,399, filed on Mar. 16, 2010.

(51) Int. Cl.
| H02K 1/12 | (2006.01) |
| H02K 1/18 | (2006.01) |
| F03D 9/00 | (2006.01) |
| H02K 21/24 | (2006.01) |

(52) U.S. Cl.
CPC .............. H02K 1/182 (2013.01); F03D 9/002 (2013.01); H02K 21/24 (2013.01); Y02E 10/725 (2013.01); Y10T 29/49009 (2015.01); Y10T 29/49826 (2015.01)

(58) Field of Classification Search
CPC .............. H02K 1/06; H02K 1/12; H02K 1/14; H02K 1/182
USPC ................. 310/180, 164, 89, 156.37
See application file for complete search history.

(56) References Cited

U.S. PATENT DOCUMENTS

| 4,731,554 A | 3/1988 | Hall et al. |
| 5,175,462 A * | 12/1992 | Yoshino et al. ............ 310/164 |
| 5,334,899 A * | 8/1994 | Skybyk .................... 310/268 |
| 6,849,982 B2 * | 2/2005 | Haydock et al. .......... 310/164 |
| 6,984,914 B2 * | 1/2006 | Kakuta et al. ........ 310/216.008 |
| 6,989,620 B2 * | 1/2006 | Nilson .................. 310/254.1 |
| 7,038,352 B1 * | 5/2006 | Chuang et al. .......... 310/254.1 |
| 2004/0124735 A1 * | 7/2004 | Hsiao ...................... 310/257 |
| 2010/0156216 A1 * | 6/2010 | Lee et al. ................... 310/89 |

FOREIGN PATENT DOCUMENTS

| JP | 60249859 | 12/1985 |
| JP | 62092755 | 4/1987 |

OTHER PUBLICATIONS

PCT International Search Report and Written Opinion for PCT/CA2011/000276, Jun. 27, 2011, copy consists of 6 pages.

* cited by examiner

*Primary Examiner* — Naishadh Desai

(57) ABSTRACT

Disclosed herein are stator components designed to facilitate stator mounting as part of a generator. Also disclosed are generators suitable for use, for example, as part of a wind turbine, their components, as well as methods for their production.

17 Claims, 5 Drawing Sheets

COMPONENTS FOR GENERATORS, THEIR USE AND STATOR MOUNTING

FIELD OF THE INVENTION

The invention relates to the field of electricity generators.

BACKGROUND TO THE INVENTION

Generators for electricity are well known in the art. Many such generators include at least one rotor and at least one stator to bring permanent magnets into close association with a stator comprising wound coils of wire, wherein movement of the magnets relative to the wound coils of wire induces a current in the wire.

Generators have been adapted for use with wind machines such as wind mills and wind turbines. Examples of such devices and their components are described in international patent publication WO2007/121563 published Nov. 1, 2007, U.S. patent application Ser. No. 12/334,333 filed Dec. 12, 2008, and U.S. Patent application 61/289,738 filed Dec. 23, 2009, all of which are incorporated herein by reference.

As described in the above-mentioned patent applications, some generators adapted for use in wind turbines may comprise at least one stationary or fixed stator comprising coils of wire, and one or more rotors each comprising one or more permanent magnets. Rotation of the rotor(s) in close proximity to the stator(s) causes the permanent magnets of the rotor(s) to pass in close proximity to the wound coils of wire of the stator(s), thus inducing a current in the wires.

There is a continuing need in the art for improved stator design, and improved components for the manufacture of such generators, particularly those suited for use in wind turbines. Mass production of wind turbines for use, for example, in domestic settings or to provide electricity for individual houses, will require continued optimization of wind turbine components and production methods.

SUMMARY OF THE INVENTION

It is an object of the present invention, at least in selected embodiments, to provide a component for a generator that is simple to manufacture and to incorporate into a generator.

Certain exemplary embodiments provide a stator base for use as a component of a generator, the stator base comprising:
   a ring or toroid for receiving thereabout coils of wires to form a stator; and
   two or more studs or projections extending outwardly from the ring or toroid for fixedly mounting the stator base to other components of the generator.

Certain other exemplary embodiments provide for a stator ring or toroid including mounting means as described and/or illustrated herein.

Certain other exemplary embodiments provide for a stator comprising the stator base as described or illustrated herein together with coiled wires wound around said ring or toroid.

Certain other exemplary embodiments provide for a stator mount for the stator as described herein, the stator mount comprising:
   a base plate;
   a spindle affixed to or integral with the base plate, extending on at least one side thereof; and
   mounting means extending about a periphery on at least one side of the base plate, comprising mounting holes each for receiving a stud or projection of the stator base for fixedly mounting the stator base to the stator mount.

Certain other exemplary embodiments provide for a generator comprising:
   a stator as described or illustrated herein;
   a stator mount as described or illustrated herein for fixedly mounting the stator, to firmly retain the stator in a fixed position relative to the stator mount, said studs or projections of the stator base each extending through a mounting hole of the mounting means of the stator mount;
   one or more rotors positioned on at least one side of the stator, mounted for rotation about the spindle relative to the stator and stator mount, about an axis generally in line with a main axis of the stator.

Certain other exemplary embodiments provide for a method for manufacture of the generator as described or illustrated herein, the method comprising:
   providing a stator mount as described or illustrated herein;
   optionally rotatably mounting a first rotor comprising at least one permanent magnet to the spindle of the stator mount, so that the first rotor is rotatable adjacent the base plate of the stator mount;
   fixedly mounting a stator as described or illustrated herein, by positioning each stud or projection in a mounting hole of the mounting means of the stator mount, said first rotor if present rotatable between the base plate of the stator mount and the stator;
   optionally rotatably mounting a second rotor comprising at least one permanent magnet to the spindle of the stator mount, so that the second rotor is rotatable adjacent the stator on an opposite side thereof to the base plate of the stator mount;
   wherein the method comprises at least one of the optional steps.

DEFINITIONS

Stator base: refers to the base structure of a stator without coils nor other components or electrical connections, but typically including a ring or toroid of a material suitable for use in a stator. A stator base may be comprised of any material, but materials that are non-magnetic or of low ferromagnetism are preferred, including but not limited to for example stainless steel, aluminum, selected metals and alloys, or resins, composites such as carbon composites, glass or epoxy materials and composites etc. Low density or low weight materials are at times preferred over dense or heavy materials.

Stud: as used herein refers to any projection or spike extending outwardly from a stator base to aid in mounting the stator base to other components of a generator. Any stud or projection may be comprised of any material, but materials that are non-magnetic or of low ferromagnetism are preferred, including but not limited to for example stainless steel, aluminum, selected metals and alloys, or resins, composites such as carbon composites, glass or epoxy materials and composites etc. A stud or projection may be an integral part of a stator base, for example produced with a mold for the stator ring or toroid, or alternatively may be affixed or adhered to a stator ring or toroid, for example via any attachment means, optionally assisted via a recess in, or bore extending through, the ring or toroid.

DETAILED DESCRIPTION OF SELECTED EMBODIMENTS

Figure 1A:
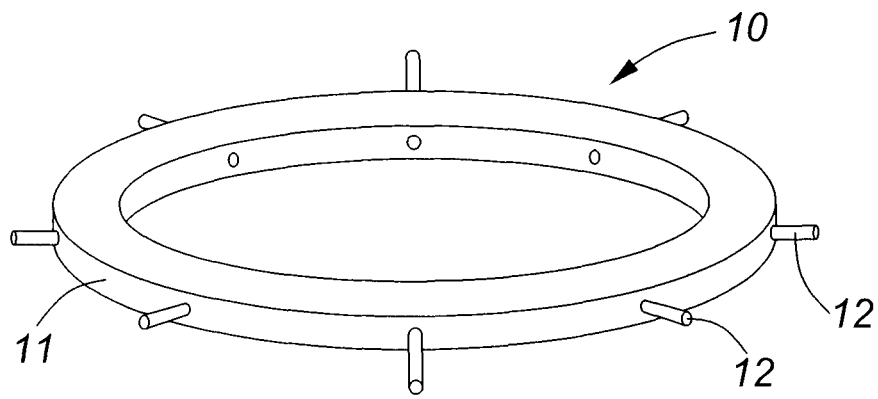
FIG. 1a illustrates an example stator base, as described herein.

There are increasing demands for electricity both in the developed and developing world. Often, small scale electricity generation is desired, for example to provide electrical power to a home, farm or neighbourhood by converting energy from ambient sources to useful electrical power. Thus there is an increased desire for large-scale production of generators to meet such needs.

The inventors have endeavoured to improve generator design and operation through the development of improved generator components. To this end, the inventors have through significant inventive ingenuity developed the stator components, stators, stator mounts and generators as described herein. Whilst they are, at least in selected embodiments, intended for use with wind turbines, the end-use for such generators is not limited in this regard, and indeed the generators and their components may be utilized for the conversation of any mechanical force suitable to drive the generator into electrical energy.

Certain exemplary embodiments provide for a stator base for use as a component of a generator. The expression "stator base" refers to any structure that forms the basis of a stator prior to the addition of wound coils of wire or other components or electrical connections. For example, in a simple form a stator base may comprise a ring or toroid of any material suitable for use in a stator, onto which coils of wire may be wound. Thus, in accordance with selected embodiments, the stator bases described herein may comprise:

a ring or toroid for receiving thereabout coils of wires to form a stator; and two or more studs or projections extending outwardly from the ring or toroid for fixedly mounting the stator base to other components of the generator. Optionally, the studs or projections may comprise three or more studs or projections arranged in a radially symmetric manner about the ring or toroid. The inclusion of more studs may result in improved fixing or mounting of the state base to other components of a generator, as will become apparent from the foregoing.

The studs or projections may take any form, configuration, or cross-section, but for practicality or simplicity may take the form of cylindrical metal projections extending from the ring or toroid. Such projections have a circular cross-sectional profile, simple to insert into other components of a generator, for example for affixing the stator in position relative to rotors.

Regardless of the shape or configuration of the studs or projections, they may be integral with the ring or toroid, for example they may be included in the mold for the production of the ring or toroid. Alternatively, they may be affixed to the main stator ring or toroid after its production via any means. For example, the studs or projections may be welded or glued into recesses in an outer surface of the ring or toroid, or welded or glued into a bore extending through the ring or toroid.

Optionally, each stud or projection may comprise an exposed portion (exposed when the stud or projection is affixed to the stator ring or toroid) and a concealed portion to be fixed to a recess in, or a bore extending through, the ring or toroid, wherein the concealed portion optionally has a width or diameter less than that of the exposed portion. This may facilitate the fitting or each stud or projection to the ring or toroid, since the diameter or size or the recess or bore in the ring or toroid may be limited such that only the portion of the stud or projection to be concealed (and having the smaller size or diameter compared to the exposed portion) can be received to form the interface between the stud/projection and the ring/toroid.

Optionally, the concealed portion of each stud or projection may be welded to the stator ring or toroid from an opposite, inner side of the ring or toroid from the exposed portion, especially if the concealed portion is accessible within a bore through the ring or toroid from an inner surface thereof.

However, each stud or projection may be affixed to a ring or toroid via any means, including screw-thread connection, friction-fit, or riveting (including a speed-nut or rivet connection).

Each projection may be dimensioned as required, but in selected embodiments may project from the ring or toroid by 1, 2, 5, 10, 20, or 30 cm or more, depending upon the application.

In any of the embodiments of the stator base described herein, a stator may be formed at least by winding coils of wires around portions of the stator ring or toroid. Such windings typically may be wound without impeding the exposure of the studs or projections e.g. for insertion into other components of a generator, as will be apparent from the foregoing or in view of the accompanying drawings.

Further exemplary embodiments include a stator mount for the stator of as described herein, the stator mount comprising:

a base plate;

a spindle affixed to or integral with the base plate, extending on at least one side thereof; and mounting means extending about a periphery on at least one side of the base plate, comprising mounting holes each for receiving a stud or projection of the stator base for fixedly mounting the stator base to the stator mount.

In this way, the stator mount provides a means to incorporate a stator base or stator as described herein into a generator of the invention. By virtue of the connection or interaction of the studs or projections of the stator base with the mounting means, the stator is fixed in position and at least substantially prevented from rotational movement relative to the stator mount and other components that may be present.

The mounting means optionally may comprise any projection(s), rim, or other extension(s) on one side generally about a periphery of the base plate suitable to include at least one mounting hole arranged to receive a stud or projection of the stator, thus to hold the stator in a fixed position distanced from the base plate. For example, if the mounting means comprises a rim extending from (or integral with) a main planar body of the base plate, then the rim may include two or more mounting holes each extending as a bore through the rim, each with an axis typically extending in a direction away from the spindle, optionally perpendicular from a main axis of the spindle. Alternatively, the mounting means may comprise two or more mounting poles, each mounting pole extending from a periphery of the base plate, optionally equidistant from the spindle. For example, the mounting poles may be affixed to the base plate in a circular arrangement about the spindle, so that the stator may be held in position via the studs extending into the holes of the mounting poles, such that the stator is concentric with the spindle. However, these examples of mounting means are non-limiting, and a mounting means as described herein includes any element extending from the base plate with a mounting hole suitable to receive a stud or projection of a stator, thus to hold the stator in position.

Optionally, if required, the mounting means or mounting poles are axially moveable relative to the base plate, thereby to adjust a distance of each mounting hole of from the base plate, so that when mounted to the stator mount, the position of the stator base can be adjusted relative to the base plate, or to any rotor or rotors rotatably mounted to the spindle.

In further exemplary embodiments, there is provided a generator comprising:

a stator as described herein;

a stator mount also as described herein, for fixedly mounting the stator, thus to firmly retain the stator in a fixed position relative to the stator mount, said studs or projections of the stator base each extending through a hole of the mounting means of the stator mount;

one or more rotors positioned on at least one side of the stator, mounted for rotation about the spindle relative to the stator and stator mount, about an axis generally in line with a main axis of the stator.

Optionally, the generator comprises two rotors each rotatably mounted on opposites sides of the stator, so that the permanent magnets of each rotor induce a current in the coils of wires of the stator when the rotors rotate relative to the stator, about the spindle. In this way, the generator may comprise two rotors, with the fixed stator sandwiched therebetween, but with a clearance suitable for induction of a current in the coiled wires of the stator as the rotors and their permanent magnetic rotate about the spindle.

The generators as described herein may co-operate with any means, components or devices to achieve or harness a mechanical force to rotate the rotors, thereby to cause current generation. For example, the rotors may be affixed directly to wind or water turbine blades to harness the kinetic energy of a wind or water flow to force the rotors to rotate. Further embodiments encompass all such devices and turbines. Thus, certain embodiments provide a wind turbine comprising a generator as described herein, and one or more wind or water-engaging surfaces that are caused to be moved upon exposure to a wind or water flow, said wind or water-engaging surfaces operably connected to said rotors thus to cause rotation of said rotors and generation of electricity.

Further exemplary embodiments will be further described with reference to the accompanying drawings, which merely illustrate selected and optional features and are in no way intended to be limiting with respect to the appended claims.

FIG. 1a illustrates one embodiment of a stator base shown generally at 10, comprising a main ring or toroid 11 and a plurality of studs or projections 12. Whilst the studs or projections 12 are shown regularly spaced and extending outwardly from the ring or toroid 11, the spacing may be irregular. Whilst not illustrated in FIG. 1a the studs 12 may optionally extend both outwardly and inwardly of the ring or toroid 11. For example, the studs or projections 12 may be affixed to the ring or toroid 12 through bores drilled through or molded into the toroid, so that the studs or projections extend from both exit points of each bore. Further, whilst the studs or projections 12 are shown as cylinders of generally circular cross-section, they may take any form, or configuration, with any uniform or non-uniform cross-sectional profile.

Figure 1B:
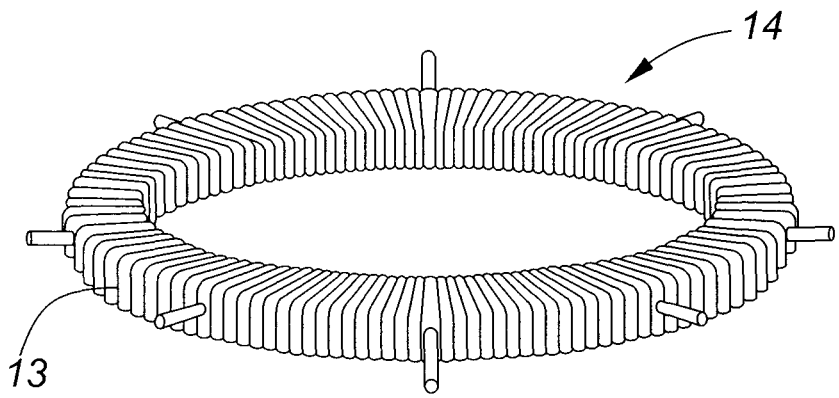
FIG. 1b illustrates an example stator, as described herein.

FIG. 1b illustrates the same stator base 10 as that shown in FIG. 1a except that wire 13 has been wound around the ring or toroid 11, whilst leaving the studs or projections 12 generally exposed or extending beyond the extent of the wound wire, thereby to form a stator shown generally at 14. Whilst not shown in FIG. 1b, any stator as described herein may further comprise some form of wrap (e.g. plastic or film wrap) wound or fixed over the wires 13 to help hold the coils in place on the stator base 10. Further components may include a wire or bundle of wires (also not shown) extending away from the wires 13 to carry electrical current generated in wires 13 to another location or to a charge storage device.

Figure 2:
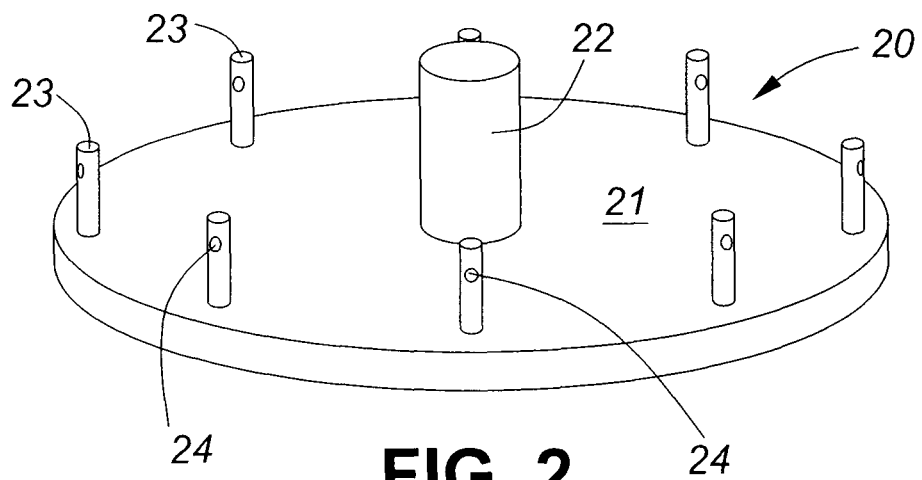
FIG. 2 illustrates an example stator mount, as described herein.

FIG. 2 illustrates an example stator mount shown generally at 20. The stator mount comprises base plate 21, and extending generally from the centre of the base plate is spindle 22, which can be integral with or affixed to the base plate 21. The stator mount 20 further comprises mounting means in this example taking the form of mounting poles 23 each extending from one side of base plate 21 on a same side as spindle 22, each mounting pole 23 comprising stud or projection receiving hole 24. Each stud or projection receiving hole 24 is generally positioned to receive, upon mounting of stator 14 to stator mount 20, each stud or projection 12 of stator 14, as will become more apparent from the foregoing. Each mounting pole 23 optionally includes axial movement means (not shown) to permit each mounting pole to be moved axially thus to change a distance of each receiving hole 24 from the base plate 21 (for example, each mounting pole may have a screw-thread attachment to base plate 21). The reasons for this preferred feature will become apparent from the foregoing.

Figure 3:
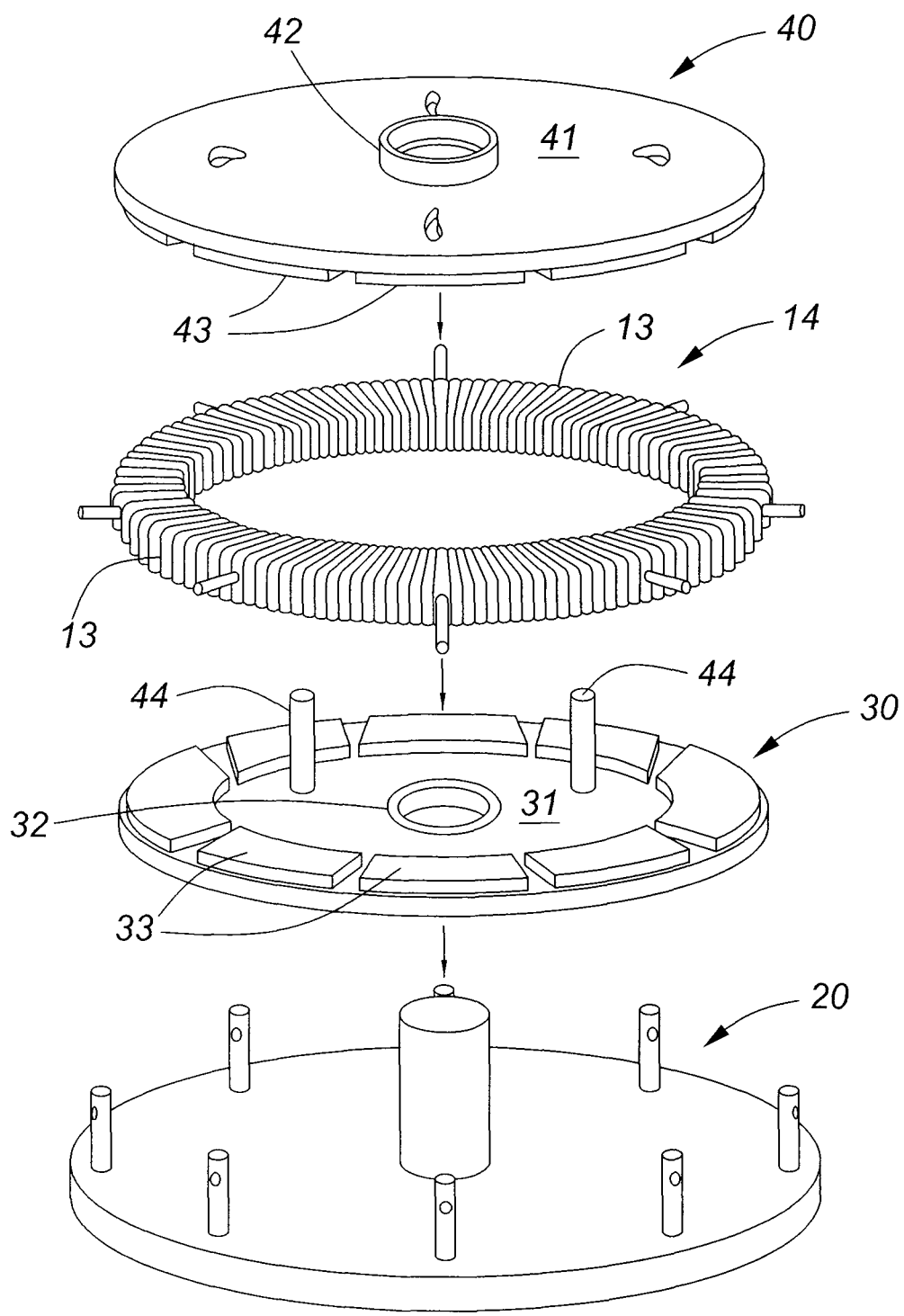
FIG. 3 illustrates an example generator as described herein, in unassembled form.

FIG. 3 illustrates an example of the assembly of a generator as described herein. FIG. 3 illustrates a rotor shown generally at 30, the rotor comprising a flywheel 31 in the centre of which is bearing 32. Also forming part of rotor 30 are a set of permanent magnets 33 arranged generally about outer regions of the rotor. The diameter of rotor 30 is generally less than that of the diameter of stator mount 20 (or at least the spacing and arrangement of the mounting poles 23 is suitable to accommodate rotor 30) so that bearing 32 of rotor 30 can be positioned on spindle 22 close to the base plate of stator mount 20 for rotation about the spindle, without being impeded by mounting poles 23.

Figure 4:
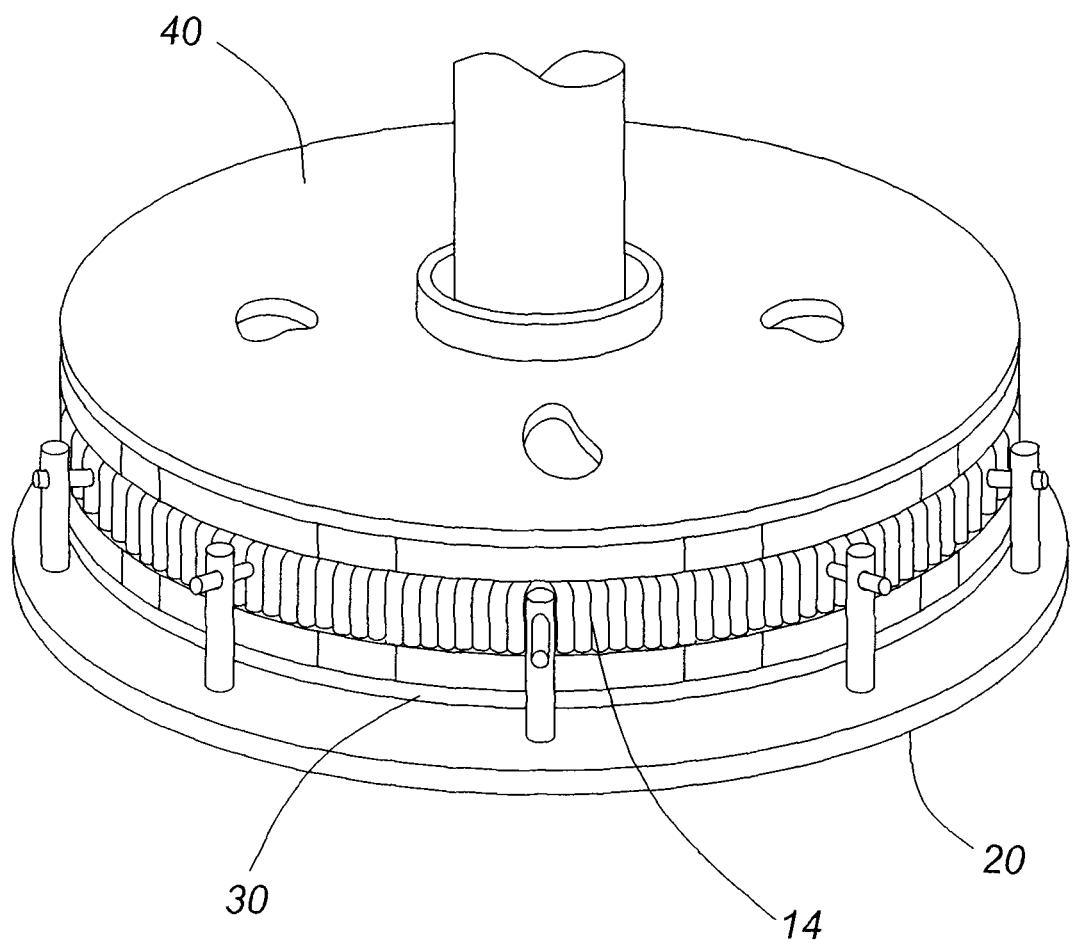
FIG. 4 illustrates an example generator as described herein, assembled.

FIG. 3 (and subsequent FIG. 4 showing the assembled generator) also illustrates the mounting of stator 14, comprising stator base 10 and wound wire 13, to stator mount 20. In this embodiment, stator 14 is affixed to stator mount 20 by inserting studs or projections 12 of stator 14 into the receiving holes 24 of the mounting poles 23 of stator mount 20. Thus, the positions of the mounting poles are generally arranged in accordance with the positions of the stator to be mounted. In this way, the stator 14 and stator mount 20 are effectively locked in position such that they are unable to move or rotate relative to one another. As shown in FIGS. 3 and 4, rotor 30 is effectively sandwiched in between base plate 21 of stator mount 20 and a lower side of stator 14. Adjustment of the mounting poles 24 via screw threaded attachment (not shown) to base plate 21 permits stator 14 to be slightly raised or lowered relative to the stator mount, so that the clearance between the permanent magnets 33 of rotor 30 and wires 13 of stator 14 can be adjusted for optimum performance of the generator during rotation of the rotor 30.

FIG. 3 also illustrates the addition of a second rotor shown generally at 40. For the purposes of this embodiment, rotor 40 is essentially identical to rotor 30, an comprises a flywheel 41 together a bearing 42 and a series of permanent magnets 43 arranged generally about a periphery of flywheel 41. However, in contrast to rotor 30, rotor 40 is lowered into position on spindle 22 of stator mount 20 in an inverted position relative to rotor 30. In this way, permanent magnets 43 face towards stator 14, such that during rotation of rotor 40 there is a small degree of clearance between permanent magnets 43 and wire 13.

FIG. 4 illustrates an assembled version of the generator assembled in accordance with FIG. 3. It will be noted that stator 14 is effectively sandwiched between rotors 30 and 40, wherein rotors 30 and 40 can rotate about spindle 22 and bearings 32 and 42. However, stator mount 20 and stator 14 are effectively fixed together via studs or projections 12 and mounting poles 23. Rotation of rotors 30 and 40, and in particular the close passing of permanent magnets 33 and 43 near wires 13 of stator 14 causes electrical current to flow in wires 13, which can be harnessed.

Rotors 30 and 40 may be freely rotatable relative to one another upon their bearings and spindle 22. Thus, for example in a practical application, wind turbine blades may be directly or indirectly, operably connected to the rotors such that the rotors are caused to rotate in opposite directions when the wind turbine blades are exposed to a wind flow. However, in other embodiments, it may be desired to have rotors 30 and 40 rotate in the same direction upon exposure of the generator and associated wind turbine blades to a wind flow. Even if the rotors 30 and 40 move in the same direction, they may nonetheless freely rotate relative to one another such that they may, for example, rotate at different speeds during the operation of the generator.

However, in still further embodiments, the rotors may be fixed together such that they must rotate in the same direction and speed during operation of the generator. In select embodiments, this may be desired for increased rotational inertia, which for example may help the wind turbine to start in a wind flow, or to prevent the wind turbine from stopping when the speed of the wind flow falls. FIG. 3 thus illustrates one example means to connect the rotors 30 and 40 to one another such that they rotate together about spindle 22 in the same direction and at the same speed. Spacers 44 are shown, essentially to extend across a gap between the flywheels 31 and 41 of rotors 30 and 40, and to bolt or otherwise affix the flywheels together. Thus, although flywheels 31 and 41 are freely rotatable, especially when forced to rotate by an external mechanical force for example derived from a wind turbine blade, they are fixed from rotation relative to one another, and thus must rotate about the spindle 22 together in the same direction and at the same speed.

In the embodiment illustrated in FIG. 3, the spacers include two spacers each affixed to the same side of the flywheels 31 and 41 as permanent magnets 33 and 43, but closer to the centre of the flywheels and closer to spindle 22. In this way, spacers 44 extend through the ring or toroid of stator 14, and thus rotate in the inner space within the ring or toroid during operation of the generator, without impeding the physical connections between the stator 14 and stator mount 20 at the studs 12 and the mounting poles 23. One, or a plurality, of spacers 44 may be present, if desired. Also note that the spacers 44 are not visible in FIG. 4 showing the assembled generator, due to the illustration of other components.

Although the embodiments illustrated in FIGS. 1 to 4 illustrate a generator and components thereof that include a single stator and two rotors, further embodiments encompass the use of a single stator and single rotor, or multiple stators and rotors within the same generator, in accordance with the teachings presented herein. In any such embodiments, a plurality of rotors, or selected rotors thereof, may again be affixed together through the use of spacers as described.

The generator illustrated in the Figures may further comprise additional components, not illustrated for simplicity and clarity of the components shown. For example, a wire or bundle of wires may extend from the stator to pass electrical current from the wires 13 to a place of use or storage for the electrical energy.

Figure 5:
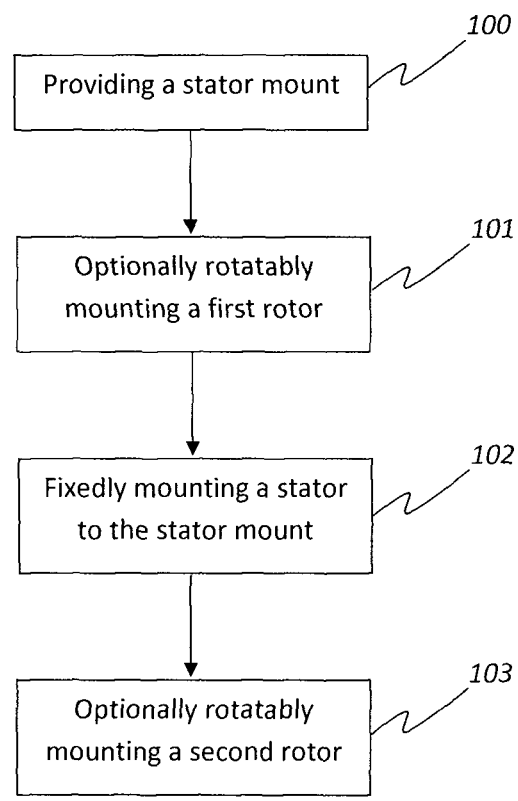
FIG. 5 illustrates an example method of producing an example generator as described herein.

Still further exemplary embodiments include a method for manufacture of the generator as disclosed and/or illustrated herein, as illustrated in FIG. 5. As shown, the method comprises:

in step 100 providing a stator mount as described and/or illustrated herein;

in optional step 101, rotatably mounting a first rotor comprising at least one permanent magnet to the spindle of the stator mount, so that the first rotor is rotatable adjacent the base plate of the stator mount;

in step 102, fixedly mounting a stator as described and/or illustrated herein, by positioning each stud or projection in a hole of a mounting pole of the stator mount, said first rotor if present rotatable between the base plate of the stator mount and the stator;

in optional step 103, rotatably mounting a second rotor comprising at least one permanent magnet to the spindle of the stator mount, so that the second rotor is rotatable adjacent the stator on an opposite side thereof to the base plate of the stator mount;

wherein the method comprises at least one of the optional steps.

Optionally, the method, comprises both optional steps, thereby to produce a generator as illustrated for example in FIG. 4.

Figure 6:
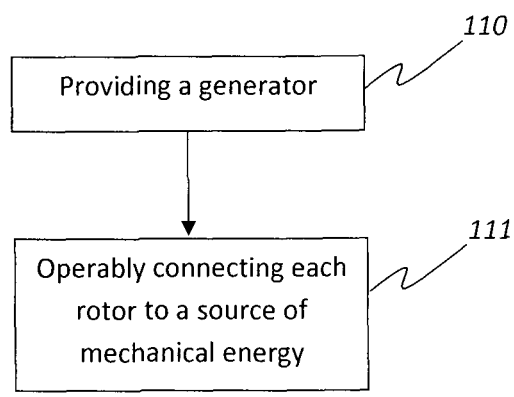
FIG. 6 illustrates an example method for generating electricity involving an example generator as described herein.

A further exemplary method is illustrated with reference to FIG. 6. The method comprises:

in step 110 providing a generator as described and/or illustrated herein;

in step 111, operably connecting each rotor to a source of mechanical energy to drive rotation of each rotor.

Optionally, the step of operably connecting comprises:

attaching each rotor directly or indirectly to a wind turbine blade; and exposing the wind turbine blade(s) to a wind flow, thus to drive movement of the blade(s) and rotation of each rotor.

Various drawings accompany the present specification to illustrate selected features as described herein. These drawings are annotated to illustrate example features of the stator base, stators, mounts therefor, and generators according to the invention. However, these are merely exemplary to illustrate preferred or optional features of the invention. The invention is not limited to these embodiments, nor the appended claims, and still further embodiments and features of the invention are nonetheless encompassed by the invention, whether explicitly described or illustrated in the present specification, or inherent therefrom.

The invention claimed is:

1. An assembly comprising:
 a stator, the stator comprising:
  a stator base, the stator base comprising:
   a ring or a toroid; and
   a plurality of studs or projections extending outwardly from the ring or the toroid for fixedly mounting the stator base to a stator mount; and
  coiled wires wound around the ring or the toroid; and
 the stator mount, the stator mount comprising:
  a base plate;
  a spindle affixed to or integral with the base plate, extending on at least one side thereof; and
  mounting means extending about a periphery on at least one side of the base plate, comprising mounting holes each for receiving one of the plurality of studs or projections of the stator base for fixedly mounting the stator base to the stator mount.

2. The assembly of claim 1, wherein the mounting means comprises two or more mounting poles extending from a periphery of the base plate, each comprising one of the mounting holes.

3. The assembly of claim 2, wherein each of the two or more mounting poles extends from the base plate equidistant from the spindle.

4. The assembly of claim 3, wherein the two or more mounting poles are axially moveable relative to the base plate, thereby to adjust a position of each mounting hole of each of the two or more mounting poles relative to the base plate, so that when mounted to the stator mount, the position of the stator base for being adjusted relative to the base plate, or to a rotor or rotors rotatably mounted to the spindle.

5. The assembly of claim 1, further comprising:
one or more rotors positioned on at least one side of the stator, mounted for rotation about the spindle relative to the stator and stator mount, about an axis generally in line with a main axis of the stator;
wherein the stator mount is for fixedly mounting the stator, to firmly retain the stator in a fixed position relative to the stator mount, each of the plurality of studs or projections of the stator base extending through a mounting hole of the mounting means of the stator mount.

6. The assembly of claim 5, wherein the one or more rotors comprise two rotors each rotatably mounted on opposites sides of the stator and each comprising at least one permanent magnet, so that the at least one permanent magnet of each rotor induces a current in the coiled wires of the stator when the two rotors rotate relative to the stator, about the spindle.

7. The assembly of claim 5, and further comprising:
one or more wind-engaging surfaces that are caused to be moved upon exposure to a wind flow, said one or more wind-engaging surfaces operably connected to said one or more rotors thus to cause rotation of said one or more rotors and generation of electricity.

8. A method for manufacture of a generator, the method comprising:
providing a stator mount comprising:
a base plate;
a spindle affixed to or integral with the base plate, extending on at least one side thereof; and
mounting means extending about a periphery on at least one side of the base plate, comprising mounting holes each for receiving one of a plurality of studs or projections of a stator base for fixedly mounting the stator base to the stator mount;
fixedly mounting a stator, the stator comprising:
the stator base, the stator base comprising:
a ring or a toroid; and
the plurality of studs or projections, wherein each of the plurality of studs or projections extends outwardly from the ring or toroid; and
coiled wires wound around the ring or the toroid;
wherein the fixedly mounting the stator comprises positioning each stud or projection of the stator base in a mounting hole of the mounting means of the stator mount;
and
performing at least one of:
rotatably mounting a first rotor comprising at least one permanent magnet to the spindle of the stator mount, so that the first rotor is rotatable adjacent the base plate of the stator mount; or
rotatably mounting a second rotor comprising at least one permanent magnet to the spindle of the stator mount, so that the second rotor is rotatable adjacent the stator on an opposite side thereof to the base plate of the stator mount.

9. The method of claim 8, wherein the performing comprises performing both of:
the rotatably mounting the first rotor comprising the at least one permanent magnet to the spindle of the stator mount, so that the first rotor is rotatable adjacent the base plate of the stator mount; and
the rotatably mounting the second rotor comprising the at least one permanent magnet to the spindle of the stator mount, so that the second rotor is rotatable adjacent the stator on the opposite side thereof to the base plate of the stator mount.

10. A method for generating electricity, the method comprising the steps of:
providing a generator, the generator comprising:
a stator, the stator comprising:
a stator base, the stator base comprising:
a ring or a toroid; and
a plurality of studs or projections extending outwardly from the ring or the toroid for fixedly mounting the stator base to a stator mount; and
coiled wires wound around the ring or toroid;
the stator mount, the stator mount comprising:
a base plate;
a spindle affixed to or integral with the base plate, extending on at least one side thereof; and
mounting means extending about a periphery on at least one side of the base plate, comprising mounting holes each for receiving one of the plurality of studs or projections of the stator base for fixedly mounting the stator base to the stator mount;
the stator mount for fixedly mounting the stator, to firmly retain the stator in a fixed position relative to the stator mount, each of the plurality of studs or projections of the stator base extending through a mounting hole of the mounting means of the stator mount; and
one or more rotors positioned on at least one side of the stator, mounted for rotation about the spindle relative to the stator and stator mount, about an axis generally in line with a main axis of the stator; and
operably connecting each of the one or more rotors to a source of mechanical energy to drive rotation of each of the one or more rotors.

11. The method of claim 10, wherein the step of operably connecting comprises:
attaching each of the one or more rotors directly or indirectly to at least one wind turbine blade; and
exposing the at least one wind turbine blade to a wind flow, thus to drive movement of the at least one wind turbine blade and rotation of each of the one or more rotors.

12. The assembly of claim 1, wherein the plurality of studs or projections comprises three or more studs or projections arranged in a radially symmetric manner about the ring or the toroid.

13. The assembly of claim 1, wherein the plurality of studs or projections comprises cylindrical projections extending from the ring or the toroid.

14. The assembly of claim 1, wherein each of the plurality of studs or projections is welded to the ring or the toroid.

15. The assembly of claim 1, wherein each of the plurality of studs or projections comprises an exposed portion and a concealed portion fixed to a recess in, or a bore extending through, the ring or the toroid, wherein the concealed portion has a width or diameter less than that of the exposed portion.

16. The assembly of claim 15, wherein the concealed portion of each of the plurality of studs or projections is welded to the ring or the toroid from an opposite, inner side of the ring or the toroid from the exposed portion.

17. The assembly of claim 1, wherein each of the plurality of studs or projections is screwed, riveted, or glued into a recess in, or a bore extending through, the ring or the toroid.

* * * * *